June 12, 1934. D. L. MATHIAS 1,962,318
ARC WELDING APPARATUS
Filed Aug. 25, 1932 2 Sheets-Sheet 2
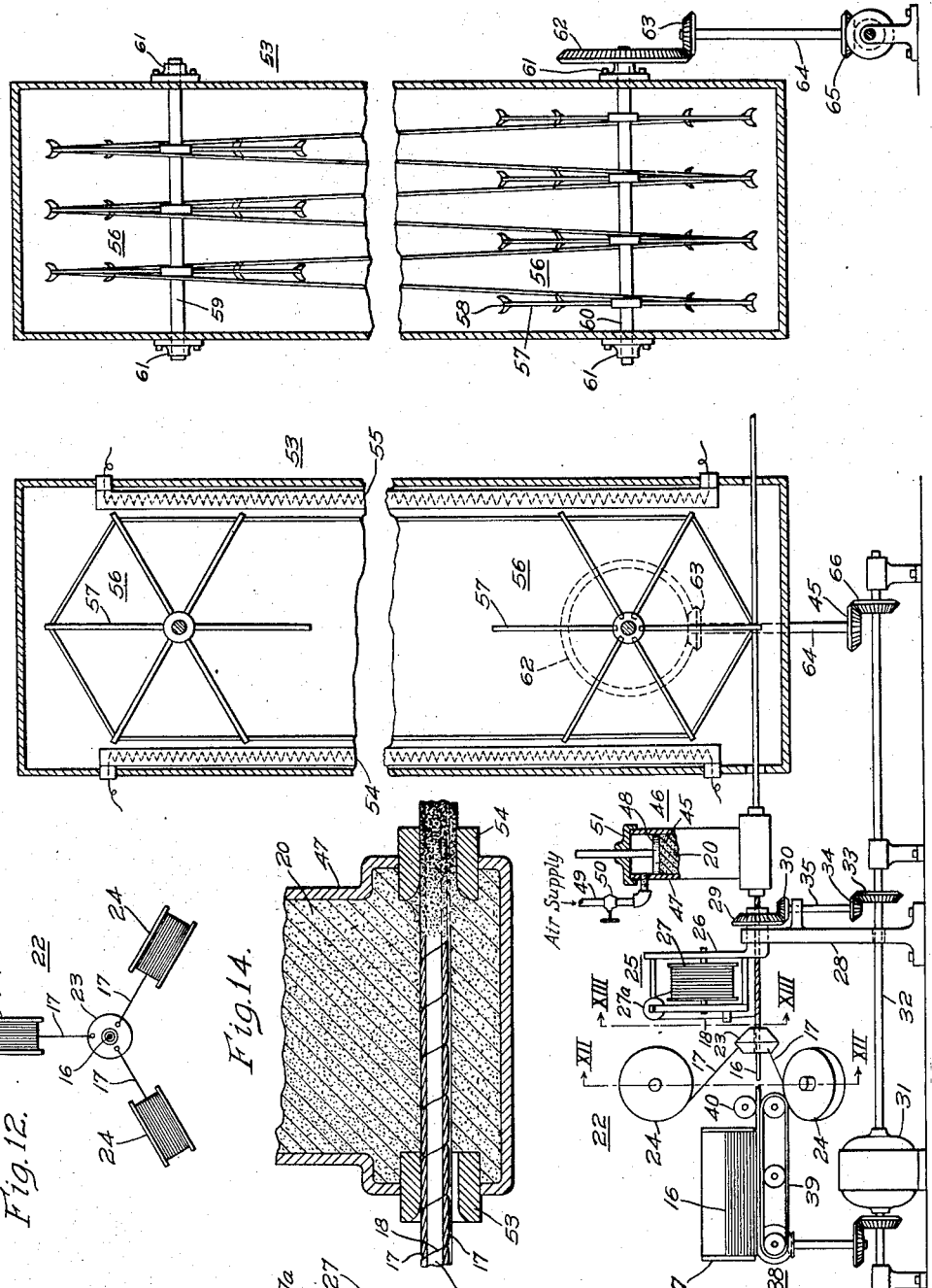
INVENTOR
David L. Mathias.
BY
ATTORNEY

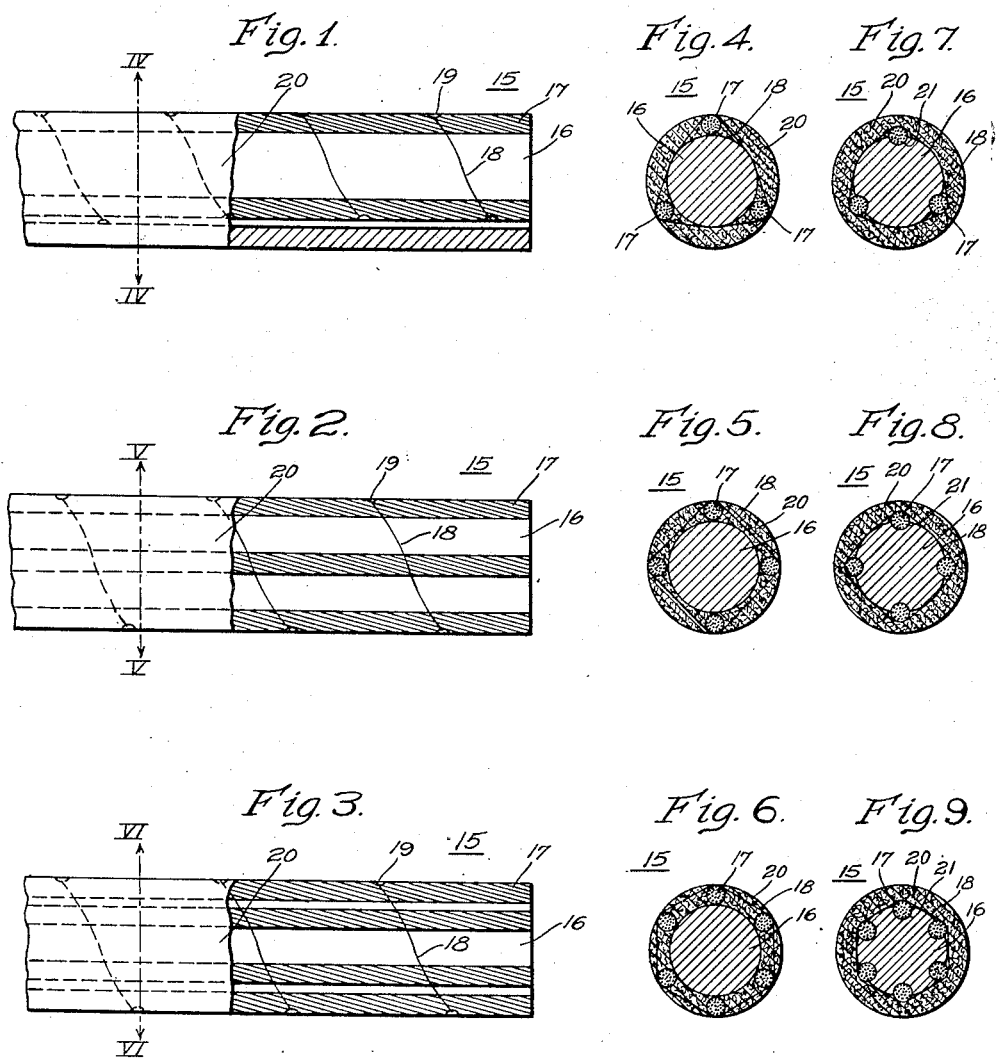

UNITED STATES PATENT OFFICE 1,962,318

ARC WELDING APPARATUS

David L. Mathias, Pittsburgh, Pa., assignor to Westinghouse Electric & Manufacturing Company, East Pittsburgh, Pa., a corporation of Pennsylvania Application August 25, 1932, Serial No. 630,363

29 Claims. (Cl. 219—8)

My invention relates, generally, to electric welding and it has particular relation to electrodes which may be used for performing an arc welding operation.

It is highly desirable to provide a coating for rods or wires that are used for performing an arc welding operation in order to furnish a blanket or shield for the arc for the purpose of excluding, to as great an extent as is possible, certain undesirable gases. These undesirable gases, such as nitrogen in particular, are objectionable for the reason that their inclusion in the metal of the weld decreases the ductility thereof to a marked degree. If no shielding blanket is provided around the arc, the gases are readily included in the metal of the weld, with the result that an unsatisfactory weld is generally obtained which is not at all suitable for use in such applications as the welding of pressure vessels, machinery frames and the like.

It is a well known fact that it is desirable to utilize a coating for the welding rod or wire which comprises organic material as well as certain inorganic materials. These materials, on combustion, form the desired protective blanket or shield for the arc and, in addition, provide the required slag forming characteristics.

One of the principal organic materials that can successfully be used is cellulose in the form of a powder, such as wood flour, or in the form of string, such as cotton fiber. The cellulosic material of this nature provides the required arc shielding blanket and, therefore, it is desirable that it be included in the construction of the electrode.

One of the chief difficulties that has been heretofore encountered in using the cellulosic material in the form of a powder, together with other materials of the powdered form, is that a concentric coating cannot be uniformly obtained without considerable difficulty and expense and an eccentric flux coating results. The eccentricity of the flux coating is caused in the extrusion process in which the central core is passed through a pair of dies between which the flux coating is extruded on the core. Unless the dies are very accurately constructed and unless the core is very carefully centered in the dies the eccentric flux coating results.

With an eccentric coating, one part of the flux shell surrounding the core is thicker than the remaining parts and consequently it is fused at an uneven rate during the welding process. Because of the fact that the thicker portion of the flux fuses more slowly than the thinner portion, an elongated tip is formed on one side of the crater surrounding the arcing end of the electrode. The tip thus formed may become of such length as to come into engagement with the work on which the welding operation is being performed, thereby seriously interfering with the manipulation of the electrode and rendering difficult the maintenance of the proper arc voltage for making a satisfactory weld.

The eccentricity of the flux coating is principally caused by the variation in the centering dies which are rapidly worn away because of the highly abrasive nature of the core material which generally is some form of steel. The wear on the dies is considerably increased if short lengths of cores are used to provide electrodes of the desired commercial length without necessitating the cutting of the core after the extrusion process has been performed. The ends of the cores usually have a slight burred edge resulting from the cutting operation, which edge serves to rapidly increase the wear of the dies.

A further cause of the eccentricity of the flux coating is the variation in the diameter of the rod or wire which forms the core of the electrode. Unless very rigid specifications are made regarding permissible tolerances of the wire with attendant increase in cost, there necessarily results a variation in the diameter of the rods or wires as they are obtained from the wire drawing mills. The variation in diameter of the core and the wear of the dies thus combine to accentuate the eccentricity of the coating of the electrode as the manufacturing process is carried out.

In order to provide a concentric coating of uniform thickness on the core, it has been proposed to wrap a string of any suitable material, such as cotton or asbestos, in open spirals around the central core and thereupon extrude a flux coating containing the desired arc shielding ingredients. The spiral wrapping serves to automatically center the core in the die, and at the same time, provides an anchorage for the flux during the subsequent drying and handling operations.

The spiral wrapping to provide a suitable spacing for the core in the dies is open to the serious objection that in its manufacture it is necessary to revolve about the core the spool or spools which contain the string which is to be wrapped around the core. In order to perform the coating process for any great length of time, it is necessary to use relatively large spools since the string of the desired size is quite bulky. The large size spools materially slow down the speed at which the electrodes may be manufactured and consequently increase their cost.

A further objection to the spiral wrapping is that it provides an unsymmetrical cross-sectional area at the arcing end of the electrode due to the spiral nature of the wrapping. There is the tendency for the welding arc to rotate due to this type of construction and it is accentuated if only a single wrapping is used thereby rendering it difficult for an operator to perform a welding operation. If more than one wrapping is used, it is very difficult to maintain them symmetrically disposed around the periphery of the core in open spirals and if they are not so maintained, the erratic operation of the arc is further increased.

A still further objection to the spiral wrapping around the core is that it does not lend itself readily to manufacturing processes. It is necessary to cut the string as soon as a length of electrode had been formed in order that it may be carried to a drying oven without pulling the spiral wrapping and the extruded flux from the ends of the electrode.

In view of the foregoing, it is an object of my invention to provide a heavily flux coated electrode which shall be satisfactory and efficient in operation and which may be readily and economically manufactured.

The principal object of my invention is to provide a welding electrode with a heavy flux coating containing arc shielding material.

Another object of my invention is to provide for manufacturing heavily fluxed welding electrodes as a continuous process.

Still another object of my invention is to provide for securing a plurality of longitudinally-disposed strings to an electrode core at a high rate of speed.

Other objects of my invention will, in part, be obvious and, in part appear hereinafter.

My invention, accordingly, is disclosed in the embodiment hereof shown in the accompanying drawings, and comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description taken in connection with the accompanying drawings, in which:

Figures 1, 2 and 3 are views in side elevation of preferred embodiments of my invention, parts of the flux coating being broken away to more clearly show the construction.

Figs. 4, 5 and 6 are views taken along lines IV—IV, V—V and VI—VI, of Figs. 1, 2 and 3 respectively.

Figs. 7, 8 and 9 are cross-sectional views similar to Figs. 4, 5 and 6, respectively, showing the invention used in connection with a grooved core.

Fig. 10 is a view, partly in side elevation, and partly in section, showing apparatus for manufacturing electrodes in accordance with this invention.

Fig. 11 is a sectional view showing the construction of the heating oven illustrated in Fig. 10.

Fig. 12 is a view along line XII—XII of Fig. 10.

Fig. 13 is a view along line XIII—XIII of Fig. 10.

Fig. 14 is an enlarged cross-sectional view of the lower portion of the extruding chamber.

Referring now to Figs. 1 through 6 of the drawings, the reference character 15 designates, generally, a welding electrode which is provided with a core 16 that is usually of a material such as steel rod or wire, depending upon the diameter thereof, which it is desired to use.

In order to provide a protective blanket around the welding arc to protect the fluid metal in the weld from injurious gases, such as nitrogen, a plurality of longitudinal members 17 is provided. The members 17 extend longitudinally along the surface of the core 16 and may be secured in spaced relationship around its periphery by any suitable retaining means.

The members 17 may be constructed of any suitable material such as cotton or asbestos string, which form conductors of the second class, or they may be constructed of metallic members under certain conditions which form conductors of the first class. In order to obtain the desired shielding blanket for the welding arc, it is preferable to construct the members 17 of cellulosic material in the form of cotton string or fiber since it has been found that material of this nature provides a very effective blanket for the welding arc. It may also be desirable to impregnate the members 17 with certain flux ingredients rather than to combine them otherwise to provide the protective blanket.

In certain other instances, however, where it is desirable to make electrical contact engagement with the core 16 for performing an automatic arc welding operation, it is desirable to construct the members 17 of a material which is a first-class conductor, such as steel wire or the like. The desired cellulosic material for providing the desired blanket for the arc may then be provided in a manner which will be set forth hereinafter. It will be readily apparent that certain of the members 17 may be of first class conductor material and that others may be of second class conductor material in the same electrode, thereby gaining the combined advantages of both types of construction.

In order to secure the members 17 in the desired position along the core 16 and to insure that their spaced relationship will be maintained, the core 16 may be coated with a binding material, such as shellac, varnish or the like, prior to application of the members 17. However, it has been found preferable to utilize an additional retaining member 18 which is wrapped around the members 17 in open spirals of a relatively large pitch.

The retaining member 18 may be composed of a cellulosic material, such as cotton string, or the like, or it may be composed of a fine metallic wire. In order to obtain high speeds in the manufacture of a welding electrode constructed in accordance with this invention, it is preferable to use a metallic wire for the retaining member 18.

It will be understood that the fine wire which is used for the retaining member 18 may be of nickel, vanadium, chrome-iron alloy, steel, copper, aluminum or the like, as may be desired to alter the characteristics of the weld metal.

In order to decrease the wear on the extruding dies to a minimum, the retaining member 18 is very tightly wrapped so that the diameter of the spiral wrapping formed by the retaining member 18 is somewhat less than the diameter of the circle which includes the outer surfaces of the members 17. As illustrated, at 19 in the drawings, the tightly wrapped retaining member 18 is slightly below the outer surface of the member 17.

In order to further provide a suitable blanket for shielding the welding arc, a fluxing compound 20 may be extruded onto the core 16 and between the longitudinal members 17, as illustrated. The flux coating 20 may comprise any suitable materials which are well known in the art, and which composition, therefore, will not be described in detail in this application.

It will be readily understood, however, that cellulosic material which it is desired to use for providing a satisfactory blanket for the welding arc may be incorporated in the flux 20. It is desirable to thus incorporate the cellulosic material in the flux 20 in the event that the members 17 are constructed of a conducting material for use in connection with automatic arc welding where it is desired to continuously conduct the welding current to the core 16, and where it would not be feasible to remove a portion of the flux coating to provide for the necessary electrical contact engagement.

It will be observed that the members 17 are uniformly spaced about the periphery of the core 16 in each of the modifications which are illustrated in Figs. 1 through 6. It will also be observed that the cross-sectional areas shown in Figs. 4, 5 and 6 will be maintained substantially constant throughout the fusion of the welding electrode with the exception of the fusion of the retaining member 18. However, the size of the retaining member 18 necessary to perform its desired function is so small as compared to the cross-sectional area of the entire electrode that its effect upon the operation of the welding arc is negligible.

While the retaining member 18 has been illustrated as being desirable it will be understood that in some instances, it may be omitted and the members 17 may be secured in position by means of a binding material, as set forth above, or they may be secured in position by means of the flux 20 which is extruded along the core 16 and between the members 17.

While modifications showing 3, 4 and 6 longitudinal members 17 have been illustrated in the drawings, it will be readily understood that various other combinations may also be used to advantage, those being shown to illustrate the invention only. It will be understood, however, that the members 17 in any combination should be substantially equally spaced apart around the periphery of the core 16 in order to obtain more desirable operating characteristics of the welding arc when an electrode of the type disclosed in this invention is used.

It may also be desirable in some instances to wrap more than one retaining member 18 around the electrode in order to increase the permissible speed of manufacture and to provide a symmetrical design of the equipment used for constructing the electrodes in accordance with this invention.

Referring now to Figs. 7, 8 and 9 of the drawings, it will be observed that the core 16 is provided with a plurality of longitudinal extending grooves 21 in which the members 17 may be disposed. This construction is desirable in certain instances where it is necessary to provide a maximum amount of flux 20 for a given cross-sectional area of the core 16.

As set forth hereinbefore, the members 17 may be secured to the core 16 in the grooves 21 by means of a suitable binding material, such as shellac, or the retaining member 18, composed of thread or metallic wire, may be used for performing the same function.

Referring now to Fig. 10 of the drawings, an apparatus for manufacturing electrodes in accordance with this invention is illustrated. The apparatus there shown comprises a head, illustrated generally at 22, which comprises a stationary die 23 through which the members 17 are guided from suitable reels 24 to the core 16 as it is fed through the die 23.

In order to secure the members 17 in the desired spaced relationship about the core 16, the revolving head, shown generally at 25, is provided. The head 25 comprises a rotatable support 26 on which is mounted a reel 27 containing the retaining member 18. The support 26 is rotatably mounted in a bracket 28 and is provided with a bevel gear 29, which is disposed to mesh with a driving gear 30, which, in turn, is driven by means of a motor 31 through a shaft 32, gears 33 and 34, and shaft 35.

The cores 16 may be fed from a suitable hopper 37 by means of a suitable feeding mechanism, shown generally at 38, comprising a belt 39 which is driven by means of the motor 31. The belt 39 cooperates with a feed roller 40 to push each successive core 16 through the die 23 where the longitudinal members 17 are positioned thereon, and subsequently secured thereto by means of the retaining member 18 which is wrapped therearound by the revolving head 25.

In order to extrude the flux 20 onto the core 16 which has been provided with the members 17 and wrapped with the retaining member 18, an extrusion chamber, shown generally at 46, is provided. The extrusion chamber 46 comprises a cylinder or chamber 47 within which a piston 48 is slidably disposed. The flux 20, which is to be extruded, is located in the cylinder 47 beneath the piston 48, as illustrated.

In order to force the piston downwardly to perform the extrusion operation, air pressure is applied to the upper part of the cylinder 47 through the connection 49 from a suitable air supply. The admission of the air to the cylinder 47 may be controlled by means of the hand valve 50.

The cylinder 47 is provided with a threaded cap 51 which may be removed, together with the piston 48, to permit the cylinder 47 to be refilled after the flux therein has been exhausted.

As is more clearly shown in Fig. 14 of the drawings in which is illustrated the extruding step in the process of manufacturing a welding electrode of the type shown in Fig. 4 of the drawings, the lower portion of the cylinder 47 is provided with extruding dies 53 and 54, the diameter of which is that of the finished electrode. This diameter is slightly less than the diameter of the circle which includes the outer surfaces of the members 17 which serve to center the core 16 in the dies 53 and 54, so that a symmetrical concentric coating of flux material may be provided on the finished electrode.

It will be apparent from Fig. 14 that the tightly wrapped retaining member 18 does not come into engagement with either of the dies 53 or 54, for the reason that the diameter of its spiral is slightly less than the diameter of the circle including the outer surfaces of the members 17. It will then be understood that the only materials coming into engagement with the dies 53 and 54 are the members 17 and the flux 20. Therefore, the wear on the dies 53 and 54 will be reduced to a minimum and the centering therein of the core 16 will be insured over a long period of operation.

In order to properly extrude the flux 20 onto the core 16, it is desirable to provide it in a somewhat fluid or plastic form. However, after the extrusion process has been completed, it is desirable to effect the setting of the flux 20 to form a hardened coating for the finished electrode, so that it may be readily handled, stored and shipped.

In order to provide for setting the flux 20 after it has been extruded, a heating chamber, shown generally at 53, is provided. The heating chamber 53 may comprise any suitable box-like structure, as illustrated, in which may be provided heating elements such as the space heaters 54 and 55. The space heaters 54 and 55 may be connected to any suitable source of electrical energy in order to provide the desired amount of heat to effect the drying and baking operation.

While electrical heating elements have been shown in connection with the heating chamber 53, it will be readily apparent that any other suitable heating means may be used for effecting the desired drying operation.

Since the cores 16 are of a comparatively short length, such as approximately 28 inches, which is a standard length in which the electrodes may be manufactured, and further, since the members 17 are applied longitudinally to the cores 16, the construction lends itself readily to a continuous drying operation which comprises passing the extruded electrodes over a series of rotatable racks 56, which are located in the drying chamber 53. Each of the racks 56 is provided with several spokes 57, the ends of which terminate in suitable forked portions 58. The distance between successive forked portions 58 is made equal to the length of the cores 16. The extruded electrode may then be wound around the several racks 56 and the joints between successive cores will be broken at the ends of the spokes 57 in the forked members 58. Because of the longitudinal members 17, a hinged joint is formed at each of the forked members 58, thereby permitting the complete electrode to assume the general form of a belt, as illustrated in the drawings.

In order to provide for the rotation of the drying racks 56, they are mounted on shafts 59 and 60 which are journalled in suitable bearings 61 that are mounted on the frame of the heating chamber 53, as illustrated. The lower set of drying racks 56 are keyed to the shaft 60 and are caused to rotate by means of a bevel gear 62, which, in turn, is driven by means of a bevel gear 63 that is mounted on a shaft 64. As illustrated, the shaft 64 is provided with a bevel gear 65, which is disposed to engage a bevel gear 66 keyed to the shaft 32.

In operation, the hopper 37 is filled with the cores 16 which are cut to the desired length. The motor 31 is energized from a suitable source and the feeding mechanism 38 is placed in operation. The cores 16 are fed into the die 23 where members 17 from the reels 24 are applied thereto, and are secured thereon by means of the retaining member 18, which is unwound from the reel 27 and over the sheave 27a as the rotatable support 26 is rotated around the axis of the core 16 by means of the gears and shafts, as hereinbefore set forth.

As the core members pass through the extrusion chamber 46, the flux 20 is extruded thereon between the members 17 and along the core 16 by means of the application of the air pressure to the upper side of the piston 48. The extruded electrode is then passed into the heating chamber 53 where it is carried over the racks 56 until it is completely dried and the flux has been properly set.

The series or chain of completed electrodes is then passed out of the heating chamber 53, and the members 17 are severed at the junction of the adjacent cores 16. Any suitable mechanism may be used for effecting this cutting operation, such as a heated electric wire which serves to burn the members 17 and the retaining member 18 at the joint, a gas flame or the like.

The electrode thus formed is usually twice the length of that required for commercial practice, and, therefore, it is cut in half and one end of each half is bared to provide a portion for electrical contact engagement in the electrode holder for performing the welding operation.

While the invention has been illustrated in connection with the manufacture of welding electrodes from cores of a predetermined length, it will be readily apparent that the same process of manufacture may be carried out by supplying the cores 16 in the form of a wire of indefinite length from a suitable reel. When a core of this character is used, it is unnecessary to make any changes in the mechanism used for applying the members 17 or the flux 20 to form the coated electrode. However, it might be desirable to make some slight changes in the heating chamber 53 in order to accommodate the fluxed electrode of indefinite length.

In the event that it is desired to manufacture a wire for automatic welding purposes in which it is necessary to conduct the welding current to the core 16 continuously during the welding operation, the members 17 may then be constructed of a material such as steel, wire or the like, as has been set forth hereinbefore. The extruding process will be identical with that described in connection with the use of cellulosic material for the members 17 except that it may be desirable to introduce into the flux 20 cellulosic material in the form of wood flour or the like, in order to obtain the desired arc shielding characteristics.

While certain specific embodiments of the invention have been shown and described, it will be readily apparent to those skilled in the art that various other modifications of the invention may be made without departing from the scope thereof. Therefore, it is intended that all matter contained in the description or shown in the accompanying drawings shall be interpreted as illustrative and not in a limiting sense.

I claim as my invention:

1. An electrode for use in arc welding comprising a fusible metallic core member, a plurality of substantially equally spaced members extending longitudinally along the core member, and retaining means for securing the longitudinally extending members in fixed relation relative to the core member.

2. An electrode for use in arc welding comprising a central core member comprising a first-class conductor, a plurality of second-class conductor members substantially equally spaced around the periphery of the core member and extending longitudinally therealong, and retaining means for securing the conductor members to the core member.

3. An electrode for use in arc welding comprising a core member, a plurality of conductors of the second-class extending longitudinally along the core member, and retaining means for securing the conductors in substantially equally spaced relation about the periphery of the core member.

4. An electrode for use in arc welding comprising a core member, a plurality of conductors of the first-class extending longitudinally along the core member, and retaining means for securing the conductors in substantially equally spaced relation about the periphery of the core member.

5. An electrode for use in arc welding comprising a fusible metallic core member, a plurality of conductors of the second-class extending longitudinally along the core member, and a retaining member spirally wrapped around the electrode for securing the conductors in substantially equally spaced relation about the periphery of the core member, the retaining member being tightly wrapped about the conductors such that the diameter of the spiral is less than the diameter of the circle including the outer surfaces of the conductors.

6. An electrode for use in arc welding comprising a fusible metallic core member, a plurality of conductors of the second-class extending longitudinally along the core member, and a conductor of the second-class spirally wrapped around the electrode for securing the longitudinal conductors in substantially equally spaced relation about the periphery of the core member.

7. An electrode for use in arc welding comprising a fusible metallic core member, a plurality of conductors of the second-class comprising cellulosic material and extending longitudinally along the core member, and retaining means for securing the conductors in substantially equally spaced relation about the periphery of the core member.

8. An electrode for use in arc welding comprising a fusible metallic core member, a plurality of conductors of the second-class comprising cellulosic material and extending longitudinally along the core member, and a conductor of the second-class spirally wrapped around the electrode for securing the longitudinal conductors in substantially equally spaced relation about the periphery of the core member.

9. An electrode for use in arc welding comprising a fusible metallic core member, a plurality of conductors of the second-class comprising cellulosic material and extending longitudinally along the core member, and a conductor of the first-class spirally wrapped around the electrode for securing the longitudinal conductors in substantially equally spaced relation about the periphery of the core member.

10. An electrode for use in arc welding comprising a fusible metallic core member, a plurality of substantially equally spaced members extending longitudinally along the core member, and a fluxing compound disposed between the longitudinal members.

11. An electrode for use in arc welding comprising a fusible metallic core member, a plurality of substantially equally spaced members of cellulosic material extending longitudinally along the core member, and a fluxing compound disposed between the longitudinal members.

12. An electrode for use in arc welding comprising a fusible metallic core member, a plurality of substantially equally spaced members extending longitudinally along the core member, retaining means for securing the longitudinally extending members in fixed relation relative to the core, and a fluxing compound disposed between the longitudinal members.

13. An electrode for use in arc welding comprising a fusible metallic core member, a plurality of substantally equally spaced members comprising cellulosic material extending longitudinally along the core member, retaining means for securing the longitudinally extending members in fixed relation relative to the core, and a fluxing compound disposed between the longitudinal members.

14. An electrode for use in arc welding comprising a fusible core member, cellulosic material in the form of strings disposed along the periphery of the core member, and weld fluxing material disposed along the core member between the strings, the strings being positioned in the fluxing material so as to present a constant cross-section of uniformly disposed fluxing ingredients as the electrode is consumed.

15. An electrode for use in arc welding comprising a fusible metallic core member, a plurality of conductors of the second-class comprising cellulosic material extending longitudinally along the core member, a conductor of the first-class spirally wrapped around the electrode for securing the longitudinal conductors in substantially equally spaced relation about the periphery of the core member, and a fluxing compound disposed between the longitudinal members.

16. An electrode for use in arc welding comprising a fusible metallic core member provided with a plurality of substantially straight longitudinally extending grooves approximately equally spaced from each other about the periphery of the core member, a plurality of conductors of the second-class disposed in the grooves, and a fluxing compound disposed between the conductors and along the core member.

17. An electrode for use in arc welding comprising a fusible metallic core member provided with a plurality of substantially straight longitudinally extending grooves approximately equally spaced from each other about the periphery of the core member, a plurality of conductors of the second class disposed in the grooves, retaining means for securing the conductors in the grooves, and a fluxing compound disposed between the conductors and along the core member.

18. In the manufacture of electrodes for arc welding, applying longitudinally to the core of the electrode a plurality of substantially equally spaced second-class conductors and filling the spaces between the longitudinal conductors with a welding flux compound.

19. In the manufacture of electrodes for arc welding, applying longitudinally to the core of the electrode a plurality of substantially equally spaced second-class conductors, spirally wrapping a retaining member about the conductors to secure them to the core, extruding a fluid fluxing compound between the conductors and along the core, and subjecting the electrode to a source of heat to cause the fluxing compound to set.

20. In the manufacture of electrodes for arc welding, applying longitudinally and successively a plurality of substantially equally spaced second-class conductors to a series of relatively short core members, spirally wrapping a retaining member about the conductors to secure them to the cores, extruding a fluid fluxing compound between the conductors and along the cores, and subjecting the series of electrodes thus formed to a source of heat to cause the fluxing compound to set.

21. An electrode for use in arc welding comprising a fusible metallic core member, a plurality of conductors of the second-class comprising cellulosic material extending longitudinally along the core member, a conductor of the second-class spirally wrapped around the electrode for securing the longitudinal conductors about the periphery of the core member, and a fluxing compound disposed between the longitudinal members.

22. An electrode for use in arc welding comprising a fusible metallic core member, a plurality of conductors of the second-class comprising cellulosic material extending longitudinally along the core member, a conductor of the first-class spirally wrapped around the electrode for securing the longitudinal conductors about the periphery of the core member, and a fluxing compound diposed between the longitudinal members.

23. An electrode for use in arc welding comprising a fusible metallic core member provided with a plurality of substantially straight longitudinally extending grooves about the periphery of the core member, a plurality of conductors of the second-class disposed in the grooves, and a fluxing compound disposed between the conductors and along the core member.

24. In the manufacture of electrodes for arc welding, applying longitudinally to the core of the electrode a plurality of conductors and filling the spaces between the longitudinal conductors with a welding flux compound.

25. In the manufacture of electrodes for arc welding, applying longitudinally to the core of the electrode a plurality of second-class conductors and filling the spaces between the longitudinal conductors with a welding flux compound.

26. In the manufacture of electrodes for arc welding, applying longitudinally to the core of the electrode a plurality of first-class conductors and filling the spaces between the longitudinal conductors with a welding flux compound.

27. In the manufacture of electrodes for arc welding, applying longitudinally to the core of the electrode a plurality of second-class conductors, spirally wrapping a retaining member about the conductors to secure them to the core, and extruding a fluxing compound between the conductors and along the core.

28. An electrode for use in arc welding comprising a fusible metallic core member, a plurality of conductors of the second-class comprising cotton string extending longitudinally along the core member, a conductor of the first-class comprising a fine wire spirally wrapped around the electrode for securing the longitudinal conductors about the periphery of the core member, and a fluxing compound disposed between the longitudinal members.

29. An electrode for use in arc welding comprising a fusible metallic core member, a plurality of conductors of the second-class comprising cotton string extending longitudinally along the core member, and a fluxing compound disposed between the longitudinal members.

DAVID L. MATHIAS.